(12) United States Patent
Hirahatake

(10) Patent No.: US 10,663,962 B2
(45) Date of Patent: May 26, 2020

(54) MAINTENANCE COMPUTER OF PLANT MONITORING AND CONTROL SYSTEM AND NON-TRANSITORY COMPUTER-READABLE RECORDING MEDIUM STORING MAINTENANCE PROGRAM OF PLANT MONITORING AND CONTROL SYSTEM

(71) Applicant: MITSUBISHI ELECTRIC CORPORATION, Chiyoda-ku, Tokyo (JP)

(72) Inventor: Masashi Hirahatake, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 63 days.

(21) Appl. No.: 15/916,329

(22) Filed: Mar. 9, 2018

(65) Prior Publication Data
US 2018/0341256 A1 Nov. 29, 2018

(30) Foreign Application Priority Data
May 24, 2017 (JP) ................. 2017-102298

(51) Int. Cl.
*G06F 9/44* (2018.01)
*G05B 23/02* (2006.01)
*G06F 11/30* (2006.01)
*G06F 8/65* (2018.01)
*G06F 11/14* (2006.01)

(52) U.S. Cl.
CPC ........ *G05B 23/0289* (2013.01); *G06F 11/302* (2013.01); *G06F 8/65* (2013.01); *G06F 11/1433* (2013.01)

(58) Field of Classification Search
CPC .......... G06F 8/71; G06F 9/44521; G06F 8/30; G06F 8/36; G06F 8/66
USPC .................................. 717/100–122
See application file for complete search history.

(56) References Cited

U.S. PATENT DOCUMENTS

2014/0282400 A1* 9/2014 Moorthi ............. G06F 8/71
717/122

FOREIGN PATENT DOCUMENTS

JP    2003-114294 A    4/2003

* cited by examiner

*Primary Examiner* — Chuck O Kendall
(74) *Attorney, Agent, or Firm* — Buchanan Ingersoll & Rooney PC

(57) ABSTRACT

To provide a maintenance computer and a maintenance program of a plant monitoring and control system in which engineers other than the program designer can check and change program source code part relevant to each of the input point information and the output point information. The maintenance computer performs code extracting processing that extracts source code part of program of an integration computer relevant to each of input point information inputted into controller from integration computer and output point information outputted to integration computer from controller.

8 Claims, 6 Drawing Sheets

MAINTENANCE COMPUTER OF PLANT MONITORING AND CONTROL SYSTEM AND NON-TRANSITORY COMPUTER-READABLE RECORDING MEDIUM STORING MAINTENANCE PROGRAM OF PLANT MONITORING AND CONTROL SYSTEM

INCORPORATION BY REFERENCE

The disclosure of Japanese Patent Application No. 2017-102298 filed on May 24, 2017 including its specification, claims and drawings, is incorporated herein by reference in its entirety.

BACKGROUND

The present invention relates to a maintenance computer of a monitoring and control system for maintaining the plant monitoring and control system provided with a controller which performs monitoring and control of each part of a plant, and an integration computer which performs calculation processing for monitoring and control of the controller and the plant by executing a program; and a non-transitory computer-readable recording medium storing a maintenance program of the plant monitoring and control system.

Japanese Patent Application Publication No. 2003-114294 (JP 2003-114294 A) discloses the monitoring maintenance system which monitors and maintains the monitoring and control system of the power generation plant from outside. The monitoring maintenance system of JP 2003-114294 A diagnoses malfunction and degradation of the equipment in the plant from outside of the plant, and formulates the maintenance plan for replacing equipment and the like.

SUMMARY

However, in JP 2003-114294 A, maintenance for program change of the plant monitoring and control system is not disclosed. In order to change the program of the plant monitoring and control system, as a matter of course, programming technique is required. There was a problem that the program could not be easily changed other than the program designer who understood the configuration of the existing program and the configuration of the plant.

Since engineer does not understand the configuration of the existing program although he has minimum programming technique, there was a problem that it was difficult for the engineer to find out source code part to be changed. Especially when the specification of replacing actuator or sensor was changed, and content of input point information inputted into the controller from the integration computer and output point information outputted to the integration computer from the controller was changed, it is necessary to find out and change source code part of the program relevant to changed the input point information and the output point information. If the program designer checks the program and changes the program as necessary whenever actuator or sensor is replaced to one having different specification, there is a problem that load of the program designer becomes high, or program change is delayed for schedule adjustment of the program designer.

Thus, it is desired to provide a maintenance computer and a maintenance program of a plant monitoring and control system in which engineers other than the program designer can check and change program source code part relevant to each the input point information and the output point information.

A maintenance computer of a plant monitoring and control system according to the present invention is a maintenance computer of a plant monitoring and control system for maintaining a plant monitoring and control system provided with a controller which performs monitoring and control of each part of a plant using monitoring and control apparatuses, and an integration computer which performs calculation processing for monitoring and control of the controller and the plant by executing a program, wherein the maintenance computer of the plant monitoring and control system performs code extracting processing that extracts source code part of the program of the integration computer relevant to each of input point information inputted into the controller from the integration computer and output point information outputted to the integration computer from the controller.

A non-transitory computer-readable recording medium storing a maintenance program of a plant monitoring and control system according to the present invention is a non-transitory computer-readable recording medium storing a maintenance program of a plant monitoring and control system provided with a controller which performs monitoring and control of each part of a plant using monitoring and control apparatuses, and an integration computer which performs calculation processing for monitoring and control of the controller and the plant by executing a program, wherein the maintenance program causes a computer to execute extracting source code part of the program of the integration computer relevant to each of input point information inputted into the controller from the integration computer and output point information outputted to the integration computer from the controller.

According to the maintenance computer and the non-transitory computer-readable recording medium storing the maintenance program of the plant monitoring and control system according to the present invention, since the source code part relevant to each the input point information and the output point information are extracted automatically, engineers other than the program designer can also check the extracted source code part, and change the source code part relevant to specific the input point information and the output point information by changing the extracted source code part. Workload can be reduced even when the program designer check and change the program. The maintenance computer and the maintenance program can perform subsequent processing using the extracted source code part.

DETAILED DESCRIPTION OF THE EMBODIMENTS

Embodiment 1

Figure 1:
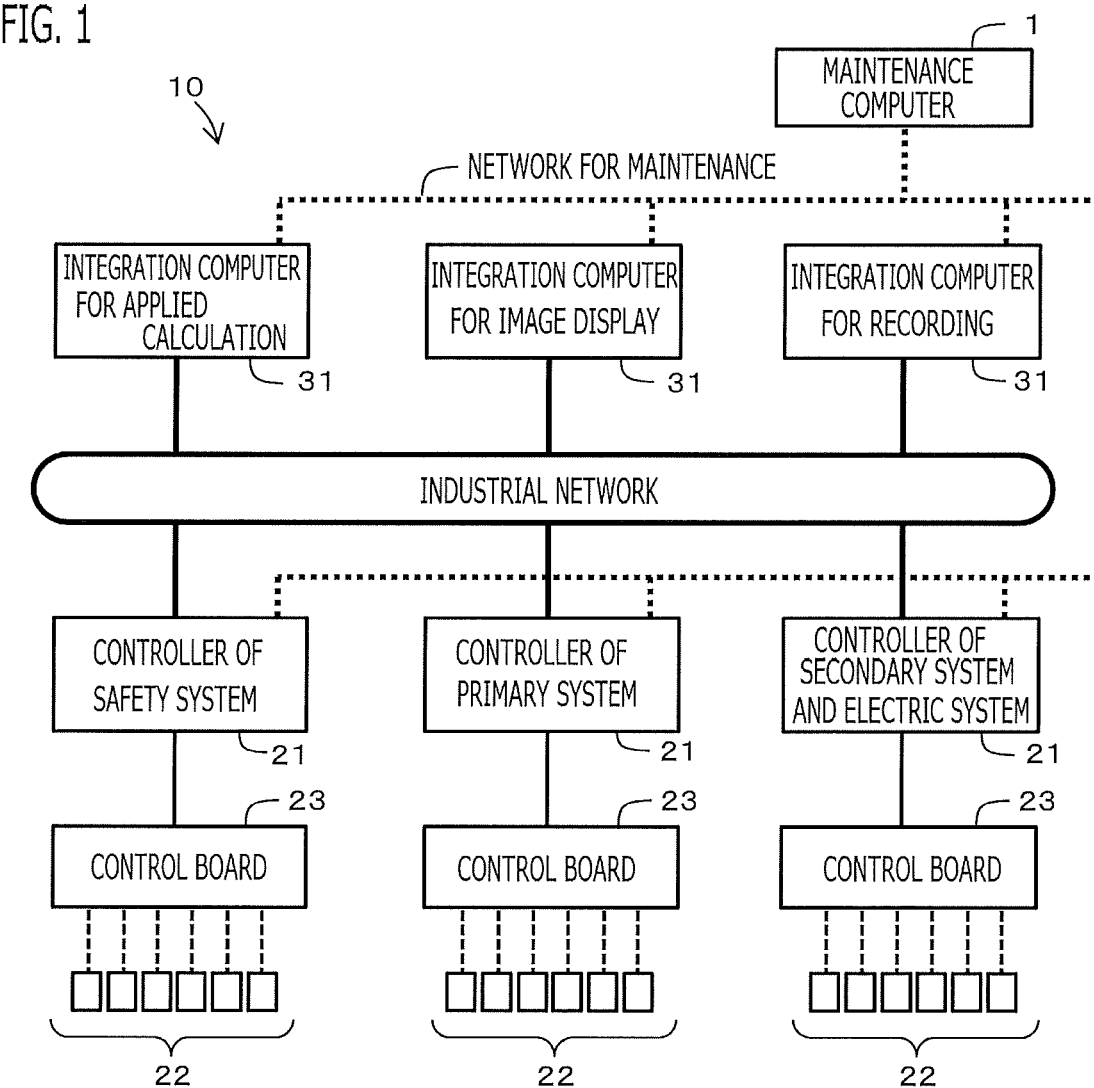
FIG. 1 is an outline entire configuration of a plant monitoring and control system according to Embodiment 1 of the present invention.

A maintenance computer 1 of a plant monitoring and control system 10 (hereinafter, referred to simply as the maintenance computer 1) according to Embodiment 1 will be explained with reference to drawings. FIG. 1 is a figure showing the outline entire configuration of the plant monitoring and control system 10.

A plant which becomes a monitoring and control object of the plant monitoring and control system 10 includes various kinds of plants, such as production facilities of nuclear power plant, thermal power plant, factory, and the like, or social infrastructure facilities of water and sewage, electric power, railroad, road, river, dam, building, and the like. In the present embodiment, the case where the plant is the nuclear power plant will be explained.

<Controller 21>

The plant monitoring and control system 10 is provided with a controller 21 which performs monitoring and control of each part of the plant using monitoring and control apparatuses 22. The monitoring and control apparatus 22 is constituted of various kinds of actuators which control each part of the plant such as valve and pump, and various kinds of sensors which monitor each part of the plant such as temperature sensor, pressure sensor, and opening degree detection sensor of the valve. A command signal to each actuator from the controller 21 is converted into an analog signal by a D/A converter, and is transmitted to each actuator. An output signal of each sensor is converted into a digital signal by an A/D converter, and is processed by the controller 21. Correspondency (conversion range, conversion resolution) between the analog signal and the digital signal in the A/D converter and the D/A converter is preliminarily set. For example, it is preliminarily set that the analog signal from 0V to 5V is A/D converted to the 10-bit digital signal, or the 10-bit digital signal is D/A converted to the analog signal from 0V to 5V.

In the present embodiment, the monitoring and control apparatus 22 is connected to the controller 21 via a control board 23. The control board 23 is placed at site on the plant side, and is connected with each the monitoring and control apparatus 22 by an individual connecting wire. The control board 23 is connected with the controller 21 via a communication wire. The A/D converter and the D/A converter are provided in the control board 23.

In the present embodiment, a plurality of controllers 21 are provided for each system of the plant. In the example shown in FIG. 1, three controllers of a controller 21 of safety system, a controller 21 of primary system, and a controller 21 of secondary system and electric system are provided. The controller 21 executes control logic which controls various kinds of actuators based on the output information of various kinds of sensors, the operation information of switches, the command signal transmitted from the integration computer 31, and the like. The control logic is configured by combination of various kinds of logical operations, such as logical sum, logical product, comparison processing, and summing processing. The controller 21 is configured to perform logical operation by digital circuits. The controller 21 may perform part or all of logical operation by executing program stored in storage apparatus by computing processing unit (computer).

The controller 21 transmits monitoring and control information, such as output information of the preselected sensor, driving information of the preselected actuator, and operation information of the preselected switch, to the outside such as the integration computer 31. The controller 21 and the integration computer 31 are data-communicatively connected to each other by the network in the plant. In this example, the network is an industrial network which is designed to communicate the monitoring and control information and the like among the equipments in the plant with high reliability.

The contents of the input point information inputted into the controller 21 from the integration computer 31 and the output point information outputted to the integration computer 31 from the controller 21 are preliminarily set. The output point information is set to the monitoring and control information, such as the output information of the preselected sensor, the driving information of the preselected actuator, and the operation information of the preselected switch. That is to say, the circuit in the controller 21 is configured to output the preselected monitoring and control information to the integration computer 31 side. The input point information is set to the command information, such as the command information of the preselected plant state, and the driving command information of the preselected actuator. That is to say, the circuit in the controller 21 is configured so that the preselected command information is inputted into the controller 21 and processed. Data information, such as variable value, of each the input point information and the output point information is transmitted to the industrial network with identifier information such as variable name.

<Integration Computer 31>

The plant monitoring and control system 10 is provided with an integration computer 31 which performs calculation processing for monitoring and control of the controller 21 and the plant by executing program. The integration computer 31 performs calculation processing for monitoring the control state of the controller 21 and the operation state of the plant based on the monitoring and control information transmitted from the controller 21. The integration computer 31 performs calculation processing for controlling the control state of the controller 21 and the operation state of the plant, and transmits command information to the controller 21.

Figure 2:
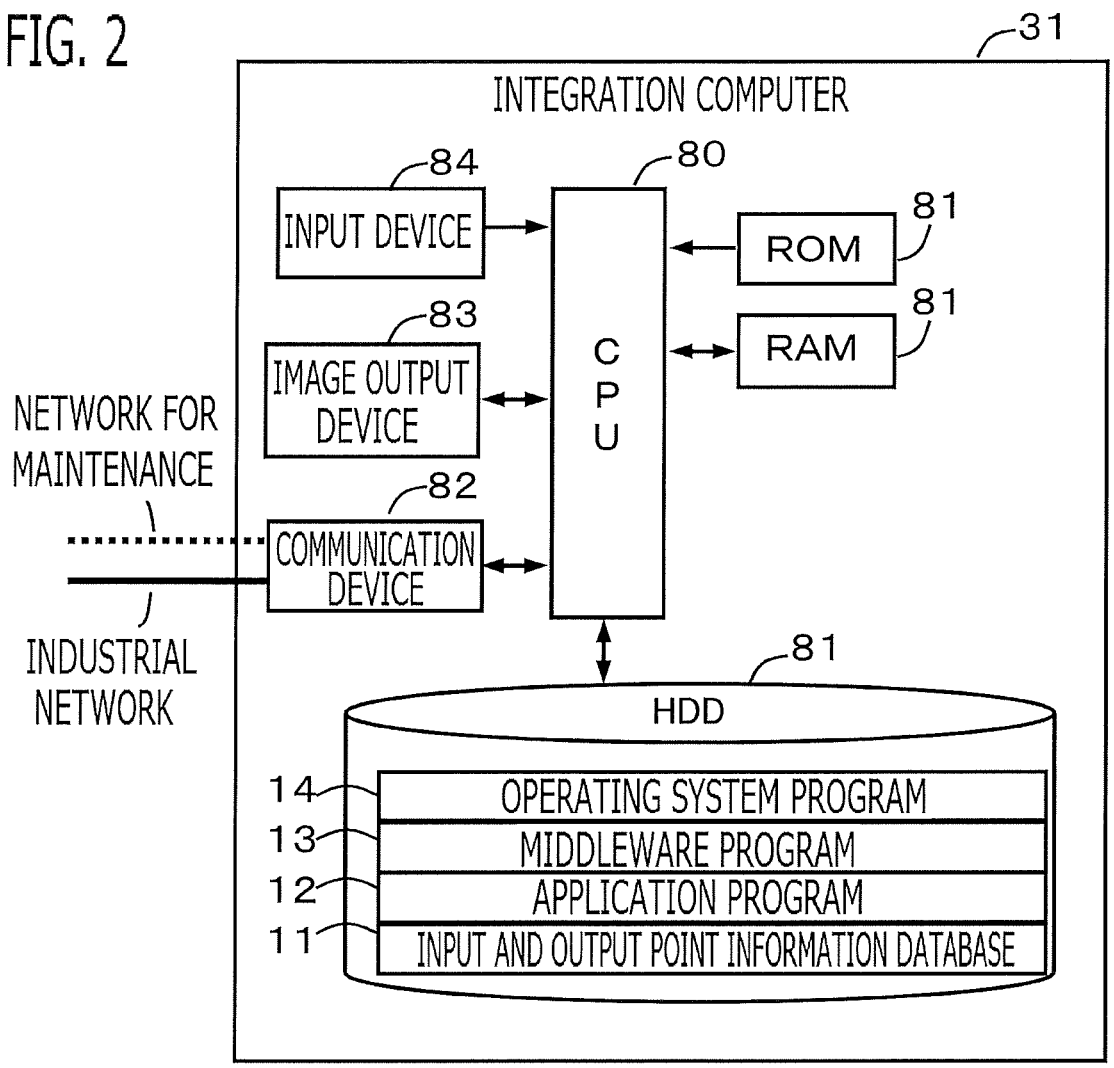
FIG. 2 is a hardware configuration diagram of an integration computer according to Embodiment 1 of the present invention.

As shown in FIG. 2, the integration computer 31 is provided with a computing processing unit (computer) 80 such as a CPU (Central Processing Unit), storage apparatuses 81 such as RAM (Random Access Memory), ROM (Read Only Memory), and HDD (Hard Disk Drive), a communication device 82 which performs data communications with outside such as the controller 21 and the maintenance computer 1, an image output device 83 which outputs image signal to the display, an input device 84 which receives input of user, and the like. The mass storage apparatus 81 such as HDD (Hard Disk Drive) stored an operating system program 14, a middleware program 13 for performing basic processing such as communication, various kinds of application programs 12 for performing calculation processing for monitoring and control, and an input and output point information database 11 stored the input point information and the output point information. The computing processing unit 80 executes the program (software) stored in the storage apparatus 81, and collaborates with other hardware devices, such as the storage apparatus 81, the communication device 82, the image output device 83, and the input device 84, so that respective calculation processings of the integration computer 31 are realized.

In the present embodiment, a plurality of integration computers 31 are provided for each purpose. In the example shown in FIG. 1, three integration computers of an integration computer 31 for applied calculation which performs applied calculation processing for monitoring and control of the controller 21 and the plant, an integration computer 31 for image display which performs processing for image-displaying monitoring and control state of the controller 21 and the plant, and an integration computer 31 for recording which performs processing for recording monitoring and control state of the controller 21 and the plant in the storage apparatus are provided. Also among the three integration computers 31, processed values are mutually transmitted via the industrial network.

In the source code of the application program 12 of the integration computer 31, each the input point information and the output point information transmitted among the controllers 21 is expressed by identifier such as variable name, and calculation processings such as four arithmetic operations and condition determination are described using the identifiers. The application program 12 executed by the integration computer 31 may be a program converted into machine language from the source code, or may be an interpreter executed while interpreting the source code one by one.

In the input and output point information database 11, content of each the input point information and the output point information transmitted among the controllers 21 is stored. For example, the input and output point information database 11 stored information of identifier such as variable name, and engineering value conversion information, such as engineering range and engineering unit, for mutually converting digital value and engineering value (physical value), about each the input point information and the output point information. The application program 12 is programmed to mutually convert digital value and engineering value of each the input point information and the output point information by referring to the input and output point information database 11, and perform applied calculation processing for monitoring and control, processing for image display, and record processing of monitoring and control state.

<Maintenance Computer 1>

Figure 4:
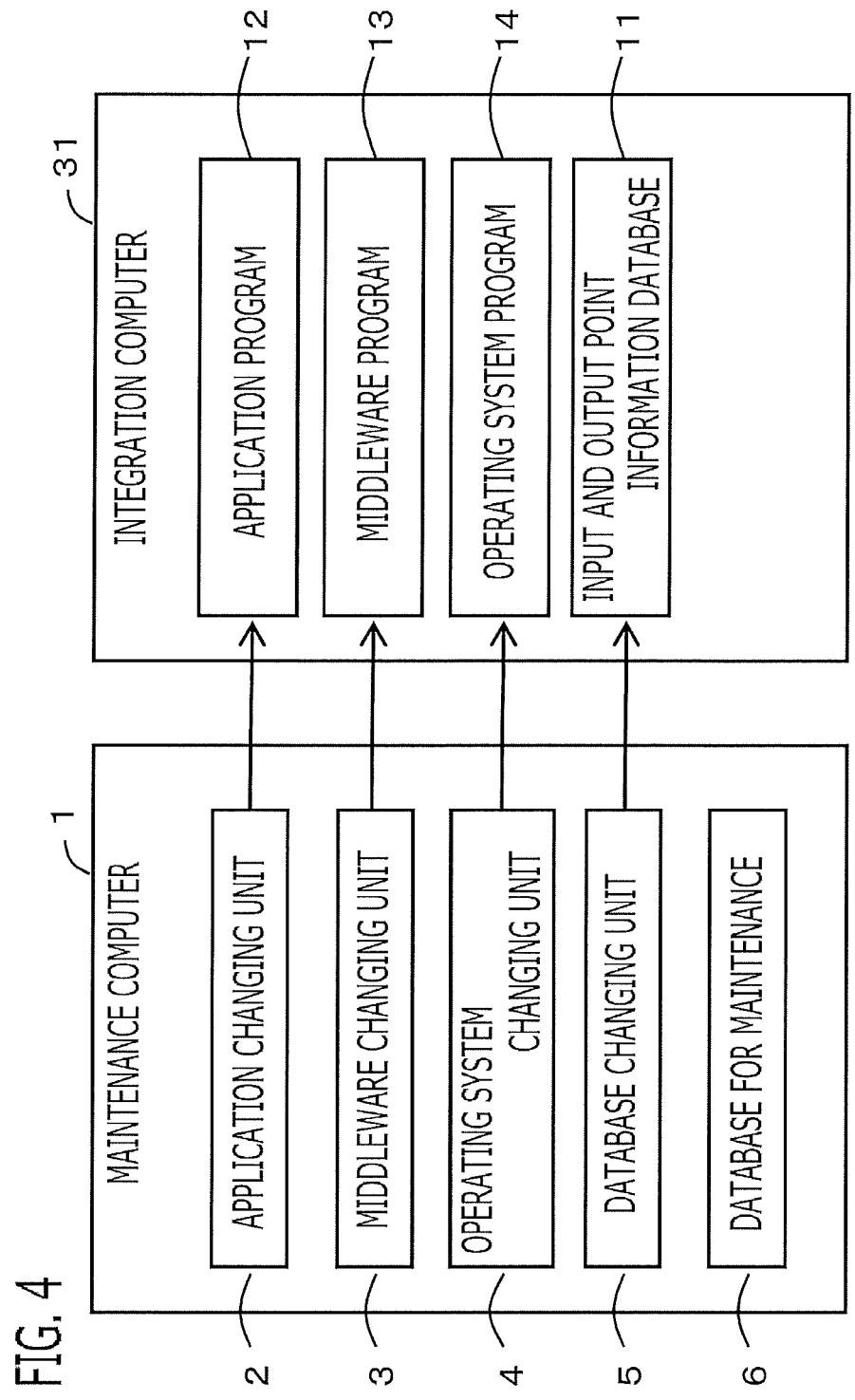
FIG. 4 is a block diagram of a maintenance computer according to Embodiment 1 of the present invention.

The maintenance computer 1 is a computer which maintains the plant monitoring and control system 10 provided with the controller 21 and the integration computer 31, as shown in FIG. 1. The maintenance computer 1 configures apart of the plant monitoring and control system 10. As shown in FIG. 4, the maintenance computer 1 is provided with functional parts such as an application changing unit 2, a middleware changing unit 3, an operating system changing unit 4, a database changing unit 5, and a database 6 for maintenance. Respective functional parts 2 to 6 of the maintenance computer 1 are realized by the processing circuit and the storage apparatus included in the maintenance computer 1.

As shown in FIG. 2, the maintenance computer 1 is provided with a computing processing unit (computer) 90 such as a CPU (Central Processing Unit), storage apparatuses 91 such as RAM (Random Access Memory), ROM (Read Only Memory), and HDD (Hard Disk Drive), a communication device 92 which performs data communications with outside such as the integration computer 31 and the controller 21, an image output device 93 which outputs image signal to the display, an input device 94 which receives input of user, and the like.

The storage apparatus 91 of the maintenance computer 1 such as the hard disk drive stored the maintenance program 7 and the database 6 for maintenance for respective functional parts 2 to 5. The computing processing unit 90 executes the program (software) stored in the storage apparatus 91, and collaborates with other hardware devices, such as the storage apparatus 91, the communication device 92, the image output device 93, and the input device 94, so that respective calculation processings of the maintenance computer 1 are realized. A non-transitory computer-readable recording medium 8 storing the maintenance program 7 may be distributed, and the maintenance program 7 may be installed in the maintenance computer 1 (the storage apparatus 91).

The maintenance computer 1 performs processing for changing program of the integration computer 31. In the present embodiment, as shown in FIG. 4, the operating system changing unit 4 changes the operating system program 14 of the integration computer 31. The middleware changing unit 3 changes the middleware program 13 of the integration computer 31. The application changing unit 2 changes various kinds of the application programs 12 of the integration computer 31. The database changing unit 5 changes the input and output point information database 11 of the integration computer 31.

Figure 3:
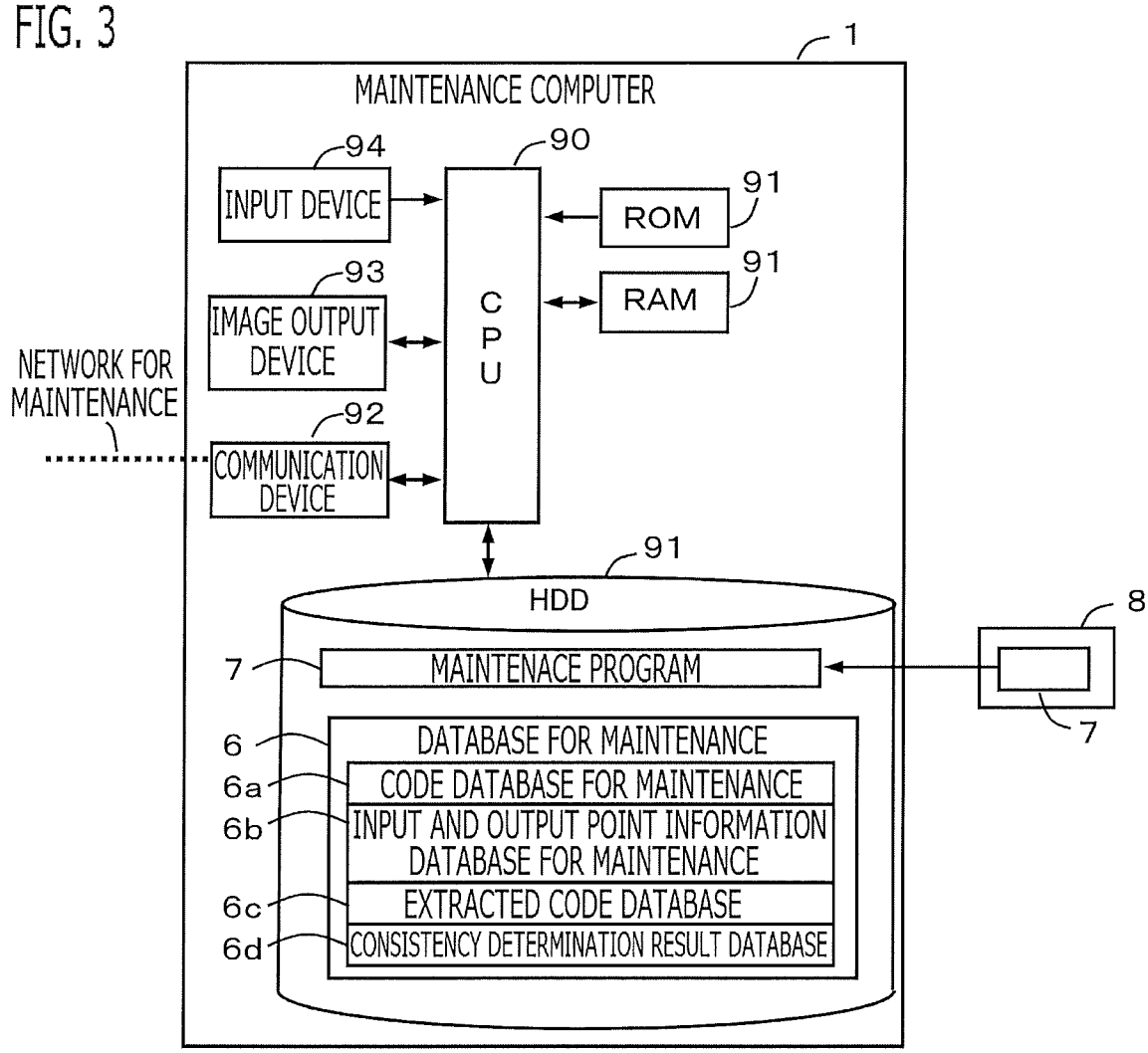
FIG. 3 is a hardware configuration diagram of a maintenance computer according to Embodiment 1 of the present invention.

As shown in FIG. 3, the database 6 for maintenance of the maintenance computer 1 includes a code database 6a for maintenance which stored the source code of the application program 12, an input and output point information database 6b for maintenance which stored the content of the input point information and the output point information of each the controller 21, an extracted code database 6c which stored the extracted source code part, and a consistency determination result database 6d. For example, the input and output point information database 6b for maintenance 6b stored information of identifier such as variable name, engineering value conversion information, such as engineering range and engineering unit, for mutually converting digital value and engineering value (physical value), name, explanation, and the like, about each the input point information and the output point information.

<Problem of Program Change>

However, in order to change the program of the integration computer 31, as a matter of course, programming technique is required. There was a problem that the program could not be easily changed other than the program designer who understood the configuration of the existing program and the configuration of the plant. The integration computers cooperate mutually in many cases, for example, the integration computer 31 for image display displays the result which the integration computer 31 for applied calculation processed. Therefore, program change requires the system design capability of the whole integration computer, the design capability of the digital control unit, and the technical capability of program change.

Since engineer does not understand the configuration of the existing program although he has minimum programming technique, there was a problem that it was difficult for the engineer to find out source code part to be changed. Especially when the specification of replacing actuator or sensor was changed and the content of input point information and the output point information was changed at the time of function updating of the plant, it is necessary to find out and change source code part of the application program 12 relevant to the changed input point information and the output point information. If the program designer changes the program whenever actuator or sensor is replaced to one having different specification, there is a problem that load of the program designer becomes high, or program change is delayed for schedule adjustment of the program designer. Therefore, about partial program change which is needed with replacement of actuator or sensor, it is desirable that the program can be changed by engineers other than the program designer or automatically, and even when the program designer changes the program, it is desirable that workload can be reduced.

<Code Extracting Processing>

Accordingly, the application changing unit 2 performs code extracting processing that extracts source code part of the application program 12 of the integration computer 31 relevant to each of the input point information inputted into the controller 21 from the integration computer 31, and the output point information outputted to the integration computer 31 from the controller 21.

According to this configuration, since the source code part relevant to each the input point information and the output point information are extracted automatically, engineers other than the program designer can also check the extracted source code part, and change the source code part relevant to specific the input point information and the output point information by changing the extracted source code part. Workload can be reduced even when the program designer changes the program. The application changing unit 2 can perform subsequent processing using the extracted source code part.

The application changing unit 2 extracts source code part relevant to the input point information and the output point information from the source code stored in the code database 6a for maintenance of the storage apparatus 91. The application changing unit 2 searches the source code using identifier, such as variable name, of each the input point information and the output point information, and extracts source code part in which each identifier is used. The application changing unit 2 may extract source code part which further uses output variable to which calculated result of the extracted source code part is outputted, in a chain reaction.

When there are a plurality of source code parts relevant to the one input point information and the output point information, a plurality of source code parts are extracted. The application changing unit 2 stores information of the extracted source code part in the extracted code database 6c of the storage apparatus 91 in association with corresponding the input point information and the output point information.

The information of the extracted source code part includes content of the source code part (for example, text data of line number which uses the identifier), information of position in the source code of the extracted source code part (for example, filename of the source code, line number), and corresponding the input point information and the output point information (for example, identifier such as variable name, engineering value conversion information, name, and explanation). A plurality of the source code parts extracted about each the input point information and the output point information are arranged for every the input point information and the output point information.

When specific the input point information and the output point information is specified by user via the input device 94, the application changing unit 2 displays information of source code part of specified the input point information and the output point information on the display.

Figure 5:
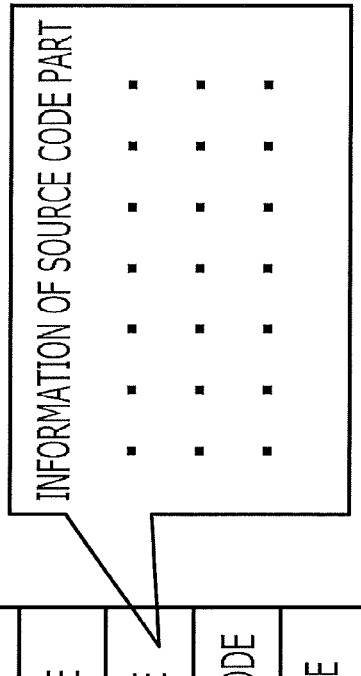
FIG. 5 is a figure showing an example of display image of code extraction result according to Embodiment 1 of the present invention.

For example, as shown in FIG. 5, the application changing unit 2 displays a matrix table representing respective packages of the application program 12, respective identifiers of the input point information and the output point information (in the example of FIG. 5, input and output point 1, input and output point 2, input and output point 3, . . . ), and presence/absence of extraction of source code part about each package and each identifier on the display. Then, when one package and identifier in which code is extracted is selected by user via the input device 94, the application changing unit 2 displays information of corresponding source code part on the display. The application changing unit 2 may open the original source code file, and may display text data of the source code part which uses the identifier, and the parts before and after thereof on the display.

When the text data of the source code part displayed on the display is changed by user via the input device 94, the application changing unit 2 may reflect the text data of the changed source code part on the original source code, and may change the original source code.

The application changing unit 2 may perform code extracting processing about the input point information and the output point information specified by user via the input device 94.

<Changed Code Extracting Processing>

In the present embodiment, when the input point information and the output point information is changed, the application changing unit 2 performs changed code extracting processing that extracts source code part of the program of the integration computer 31 relevant to each of changed the input point information and the output point information.

According to this configuration, when the input point information and the output point information is changed by replacement of actuator and sensor, configuration change of the controller 21, and the like, related source code part is extracted automatically. Then, engineer other than the program designer can also check the source code part, or can change the source code part relevant to changed the input point information and the output point information by changing the extracted source code part. Workload can be reduced even when the program designer change the program. The application changing unit 2 can perform subsequent processing using the extracted source code part.

The maintenance computer 1 includes the input and output point information database 6b for maintenance which stored the content of the input point information and the output point information of each the controller 21 as mentioned above. The database changing unit 5 changes the input and output point information database 6b for maintenance in the storage apparatus 91, when there is an input which changes the content of the input point information and the output point information from user via the input device 94. The application changing unit 2 performs changed code extracting processing, when changing the content of the input point information and the output point information stored in the input and output point information database 6b for maintenance.

For example, when specification of actuator and sensor (for example, range of command value or output value, engineering unit, and the like), specification (conversion range, conversion resolution, and the like) of the A/D converter and the D/A converter of the controller 21 (the control board 23), or processing inside the controller 21 is changed, the engineering value conversion information, such as engineering range and engineering unit, for mutually converting digital value and engineering value (physical value) in the content of corresponding the input point information and the output point information is changed. When the input point information and the output point information is deleted, the content (information of identifier, engineering value conversion information, and the like) of corresponding the input point information and the output point information is deleted. When the input point information and the output point information is added, the content (information of identifier, engineering value conversion information, and the like) of corresponding the input point information and the output point information is added.

As is the case with the code extracting processing mentioned above, the application changing unit 2 searches the source code using identifier such as variable name of each the input point information and the output point information where there is change in the input and output point information database 6b for maintenance, and extracts source code part which use each identifier. The application changing unit 2 may extract source code part which further uses output variable to which calculated result of the extracted source code part is outputted, in a chain reaction. The application changing unit 2 stores information of the extracted source code part in the extracted code database 6c of the storage apparatus 91 in association with corresponding the input point information and the output point.

When the input point information and the output point information is added, the application changing unit 2 may extract source code part of the program of the integration computer 31 relevant to the input point information and the output point information similar to added the input point information and the output point information.

<Code Extracting Processing>

The application changing unit 2 performs code changing processing that changes the source code part extracted by changed code extracting processing in accordance with the changed content of the input point information and the output point information.

According to this configuration, when the input point information and the output point information is changed, the program can be automatically changed without the program designer, and maintenance cost of the plant can be reduced.

When arithmetic expression of the source code part is a preliminarily set arithmetic expression which can be changed automatically according to the changed content of the input point information and the output point information, the application changing unit 2 changes the arithmetic expression according to a preliminarily set change rule; and when it is not the arithmetic expression which can be changed automatically, the application changing unit 2 does not change the source code part, stores that it was not able to change, and informs user about it. The user can manually change the source code part which was not changed automatically.

For example, when there is change of engineering value conversion information, such as engineering range and engineering unit, of the input point information and the output point information by specification change of actuator and sensor, the application changing unit 2 changes engineering range and engineering unit of output variable to which the calculated result of the corresponding source code part is outputted, and engineering range and engineering unit of arithmetic expression of the source code part. The application changing unit 2 may change engineering range and engineering unit of output variable and arithmetic expression of source code part which further uses the variable of which engineering range and the engineering unit was changed, in a chain reaction. For example, the application changing unit 2 changes engineering range and engineering unit of output variable and arithmetic expression of the source code part, so that change ratio and offset value change width of engineering range and engineering unit before and after change in the output variable and the arithmetic expression of the source code part corresponds to change ratio and offset value change width of engineering range and engineering unit before and after change in the input point information and the output point information.

For example, when the input point information and the output point information is deleted, the application changing unit 2 deletes corresponding identifier from the arithmetic expression of the corresponding source code part. For example, in the case of arithmetic expression which picks out the largest one from three variables, corresponding identifier is deleted and it is changed into arithmetic expression which picks out larger one from two remaining variables. In the case of arithmetic expression which adds three variables, corresponding identifier is deleted and it is changed into arithmetic expression which adds two remaining variables. On the other hand, when the arithmetic expression of the corresponding source code part is not arithmetic expression which can be changed automatically, such as multiplication, division, and the like, the application changing unit 2 does not change the arithmetic expression.

For example, when the input point information and the output point information is added, the application changing unit 2 adds identifier and the like of added the input point information and the output point information to source code part which performs interface processing, so that added the input point information and the output point information can be used in the application program 12.

<Consistency Determination Processing>

The application changing unit 2 performs consistency determination processing that determines consistency between the source code part after the code changing processing, and content of the input point information and the output point information, and informs user about information of part determined that there is no consistency.

For example, the application changing unit 2 determines consistency between engineering range and engineering unit of changed the input point information and the output point information, and engineering range and engineering unit of output variable and arithmetic expression of the changed source code part, from the viewpoint of evaluation index, such as change ratio and offset value change width. The application changing unit 2 determines whether information of identifier of deleted the input point information and the output point information is deleted from the source code part extracted by the changed code extracting processing. The application changing unit 2 determines whether information of identifier of added the input point information and the output point information is added to the source code part which performs the interface processing.

When determining that the controller 21 does not correspond to added and changed the input point information and the output point information, the application changing unit 2 informs user that it is necessary to change the controller 21. In this case, the application changing unit 2 may inform content of change, for example, that it is necessary to picks out, as an output point information, a sensor signal inputted into the controller 21, an internal processing signal in the controller 21, and the like.

The application changing unit 2 stores content of the source code part and the input point information and the output point information, which are determined that there is no consistency, in the consistency determination result database 6d, and displays it on the display.

Engineer or program designer checks the inconsistent part displayed on the display, manually changes content of the source code part, and the input point information and the output point information determined that there is no consistency, and completes change of source code.

<Rewriting of Program and Database>

When rewriting command of program of the integration computer 31 is inputted by user via the input device 94, the application changing unit 2 transmits changed package of the application program 12 to the storage apparatus 81 of the integration computer 31 to rewrite it. The database changing unit 5 transmits the changed input and output point information database 6b for maintenance to the input and output point information database 11 in the storage apparatus 81 of the integration computer 31 to rewrite it.

The application changing unit 2 converts the changed source code into machine language to transmit. Alternatively, when program is interpreter, the application changing unit 2 transmits the changed source code as it is.

In the present embodiment, the application changing unit 2 transmits updating package of the application program 12 to the storage apparatus 81 of the integration computer 31 via the network for maintenance, and after completion of transmission, makes the integration computer 31 stop currently executing package of the application program 12 and start executing of the updating package of the application program 12. The database changing unit 5 transmits the updating input and output point information database to the storage apparatus 81 of the integration computer 31 via the network for maintenance, and in synchronization with execution start of the updating application program 12, makes the integration computer 31 stop use of the currently using input and output point information database and start use of the updating input and output point information database.

According to this configuration, it is possible to suppress interrupting processing of the integration computer 31 for updating program and database of the integration computer 31.

<Flowchart>

Figure 6:
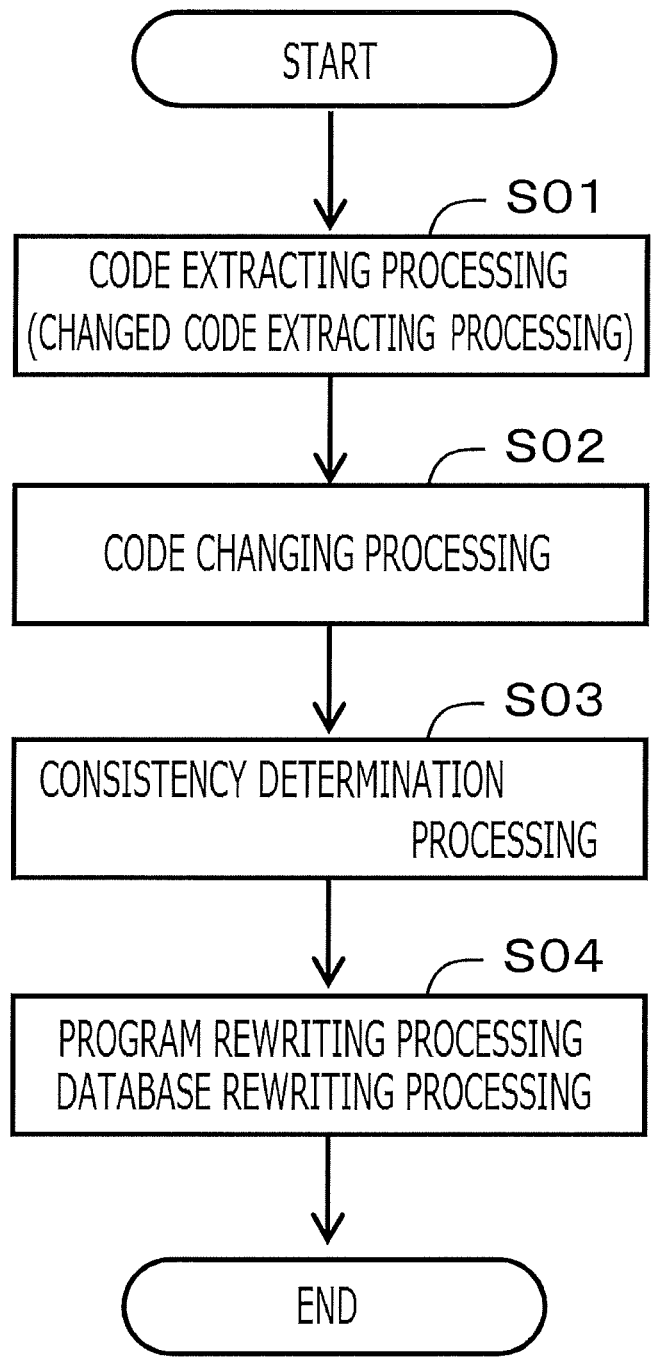
FIG. 6 is a flow chart showing processing by a maintenance computer according to Embodiment 1 of the present invention.

The procedure of processing of the maintenance computer 1 (maintenance program and maintenance method) according to Embodiment 1 will be explained based on the flowchart represented in FIG. 6. The processing in the flowchart of FIG. 6 is executed by the computing processing unit 90 (computer) of the maintenance computer 1 executing the maintenance program 7 (software) stored in the storage apparatus 91. The maintenance program 7 stored in the non-transitory computer-readable recording medium 8 may be installed in the maintenance computer 1 (the storage apparatus 91).

In the step S01, as mentioned above, the application changing unit 2 of the maintenance computer 1 performs the code extracting processing (code extraction step) that extracts source code part of the application program 12 of the integration computer 31 relevant to each of the input point information inputted into the controller 21 from the integration computer 31, and the output point information outputted to the integration computer 31 from the controller 21.

In the present embodiment, as mentioned above, in the code extracting processing, even when the input point information and the output point information is changed, the application changing unit 2 performs the changed code extracting processing that extracts source code part of the program of the integration computer 31 relevant to each of changed the input point information and the output point information.

Then, in the step S02, as mentioned above, the application changing unit 2 performs the code changing processing (code changing step) that changes the source code part extracted by the changed code extracting processing in accordance with changed content of the input point information and the output point information.

In the step S03, as mentioned above, the application changing unit 2 performs the consistency determination processing (consistency determination step) that determines consistency between the source code part after the code changing processing, and content of the input point information and the output point information, and informs user about information of part determined that there is no consistency.

In the step S04, as mentioned above, after completion of source code change, the application changing unit 2 performs the program rewriting processing (program rewriting step) that transmits the updating application program 12 to the storage apparatus 81 of the integration computer 31 via the network for maintenance, and after completion of transmission, makes the integration computer 31 stop currently executing of the application program 12 and start executing of the updating application program 12. And as mentioned above, the database changing unit 5 performs the database rewriting processing (database rewriting step) that transmits the changed input and output point information database 6b for maintenance to the input and output point information database 11 in the storage apparatus 81 of the integration computer 31 to rewrite it.

Other Embodiments

Lastly, other embodiments of the present invention will be explained. Each the configurations of embodiments to be explained below is not limited to be separately utilized but can be utilized in combination with the configurations of other embodiments as long as no discrepancy occurs.

(1) In the above-mentioned Embodiment 1, there has been explained the case where when the input point information and the output point information is changed, the maintenance computer 1 performs the changed code extracting processing that extracts source code part of the application program 12 of the integration computer 31 relevant to each of changed the input point information and the output point information. However, embodiments of the present invention are not limited to the foregoing case. That is to say, as explained in the above-mentioned Embodiment 1, regardless of presence/absence of change of the input point information and the output point information, the maintenance computer 1 may perform the code extracting processing that extracts source code part of the application program 12 relevant to each the input point information and the output point information. For example, the application changing unit 2 may perform the code extracting processing about all the input point information and the output point information, or may perform the code extracting processing about the input point information and the output point information selected by user.

(2) In the above-mentioned Embodiment 1, there has been explained the case where the maintenance computer 1 determines consistency between the source code part after the code changing processing, and content of the input point information and the output point information. However, embodiments of the present invention are not limited to the foregoing case. That is to say, regardless of the presence/absence of the code changing processing, the application changing unit 2 may perform the consistency determination processing that determines consistency between the source code part extracted by the code extracting processing and content of the input point information and the output point information, and inform user about information of part determined that there is no consistency.

(3) In the above-mentioned Embodiment 1, there has been explained the case where the maintenance computer 1 transmits the updating application program, and updating the input and output point information database to the integration computer 31 via the network for maintenance. However, the maintenance computer 1 may transmit the updating application program, and updating the input and output point information database to the integration computer 31 via other networks, such as the industrial network.

Various modifications and alterations of this invention will be apparent to those skilled in the art without departing from the scope and spirit of this invention, and it should be understood that this is not limited to the illustrative embodiments set forth herein.

What is claimed is:

1. A maintenance computer of a plant monitoring and control system for maintaining the plant monitoring and control system provided with a controller which performs monitoring and control of each part of a plant using monitoring and control apparatuses, and an integration computer which performs calculation processing for monitoring and control of the controller and the plant by executing a program, comprising:
   a processor; and
   a memory storing one or more instructions that, when executed, cause the processor to:
      receive, from the integration computer, input point information inputted into the controller and output point information provided from the controller to the integration computer, wherein the input point information and the output point information are associated with a selected sensor or actuator of the monitored plant and controlled by the plant monitoring and control system, wherein the input point information comprises one or more commands for the selected sensor or actuator, wherein the output point information comprises one or more outputs of the selected sensor or actuator;
      extract, from one or more source code databases, only a source code part of the program of the integration computer relevant to the input point information and the output point information; and
      output the source code part.

2. The maintenance computer of the plant monitoring and control system according to claim 1, wherein the maintenance computer of the plant monitoring and control system performs consistency determination processing that determines consistency between the source code part extracted by the code extracting processing and content of the input point information and the output point information, and informs user about information of part determined that there is no consistency.

3. The maintenance computer of the plant monitoring and control system according to claim 1, wherein when the input point information and the output point information is changed, the maintenance computer of the plant monitoring and control system performs changed code extracting processing that extracts the source code part of the program of the integration computer relevant to each of the changed input point information and the changed output point information.

4. The maintenance computer of the plant monitoring and control system according to claim 3, wherein the maintenance computer of the plant monitoring and control system performs code changing processing that changes the source code part extracted by the changed code extracting processing, in accordance with changed content of the input point information and the output point information.

5. The maintenance computer of the plant monitoring and control system according to claim 4, wherein the maintenance computer of the plant monitoring and control system performs consistency determination processing that determines consistency between the source code part after the code changing processing, and content of the input point information and the output point information, and informs user about information of part determined that there is no consistency.

6. The maintenance computer of the plant monitoring and control system according to claim 1, wherein the maintenance computer of the plant monitoring and control system extracts, as information of the source code part, information of content and position in the source code of the source code part.

7. The maintenance computer of the plant monitoring and control system according to claim 1, wherein the maintenance computer of the plant monitoring and control system performs program rewriting processing that transmits updating program to a storage apparatus of the integration computer via a network for maintenance, and after completion of transmission, makes the integration computer stop currently executing program and start executing of the updating program.

8. A non-transitory computer-readable recording medium storing a maintenance program of the plant monitoring and control system provided with a controller which performs monitoring and control of each part of a plant using monitoring and control apparatuses, and an integration computer which performs calculation processing for monitoring and control of the controller and the plant by executing a program, wherein the maintenance program, when executed, causes a maintenance computer to:
   receive, from the integration computer, input point information inputted into the controller and output point information provided from the controller to the integration computer, wherein the input point information and the output point information are associated with a selected sensor or actuator of the monitored plant and controlled by the plant monitoring and control system, wherein the input point information comprises one or more commands for the selected sensor or actuator, wherein the output point information comprises one or more outputs of the selected sensor or actuator;
   extract, from one or more source code databases, only a source code part of the program of the integration computer relevant to the input point information and the output point information; and
   output the source code part.

\* \* \* \* \*